United States Patent [19]

Matern et al.

[11] Patent Number: 5,592,473
[45] Date of Patent: *Jan. 7, 1997

[54] PRIVATE BRANCH EXCHANGE SYSTEM AND METHODS FOR OPERATING SAME

[75] Inventors: William T. Matern; Amy K. Leach, both of Newton, N.H.

[73] Assignee: Newton Communications, Inc., Newton, N.H.

[ * ] Notice: The term of this patent shall not extend beyond the expiration date of Pat. No. 5,313,459.

[21] Appl. No.: 416,739

[22] PCT Filed: Oct. 7, 1993

[86] PCT No.: PCT/US93/09609

§ 371 Date: Apr. 7, 1995

§ 102(e) Date: Apr. 7, 1995

[87] PCT Pub. No.: WO94/09603

PCT Pub. Date: Apr. 28, 1994

Related U.S. Application Data

[63] Continuation-in-part of Ser. No. 958,310, Oct. 8, 1992, Pat. No. 5,313,459.

[51] Int. Cl.⁶ ................................................. H04Q 11/04
[52] U.S. Cl. ........................... 370/264; 370/267; 379/67; 379/88; 379/89; 379/201

[58] Field of Search .................. 370/58.1, 62, 68.1, 370/110.1; 379/67, 88, 89, 201

[56] References Cited

U.S. PATENT DOCUMENTS

| | | | |
|---|---|---|---|
| 4,215,247 | 7/1980 | Lambert | 370/62 X |
| 4,371,752 | 2/1983 | Matthews et al. | 179/7.1 TP |
| 4,656,625 | 4/1987 | Nojiri et al. | 370/62 |
| 4,809,262 | 2/1989 | Klose et al. | 370/62 |
| 4,926,461 | 5/1990 | Kuok | 379/67 |
| 4,991,169 | 2/1991 | Davis et al. | 370/77 |
| 5,060,227 | 10/1991 | Finely et al. | 370/79 |
| 5,125,024 | 6/1992 | Gokcen et al. | 379/88 |
| 5,313,459 | 5/1994 | Matern | 370/58.1 |

Primary Examiner—Douglas W. Olms
Assistant Examiner—Russell W. Blum
Attorney, Agent, or Firm—Hayes, Soloway, Hennessey, Grossman & Hage, P.C.

[57] ABSTRACT

A digital private branch exchange system and methods of operating same are provided. A system is capable of providing improved and integrated conferece calling, voice mail, music on hold, and call forwarding features, without being subject to the typical problems associated with the prior art.

53 Claims, 6 Drawing Sheets

PRIVATE BRANCH EXCHANGE SYSTEM AND METHODS FOR OPERATING SAME

The present application is, in part, a continuation of application Ser. No. 07/958,310 filed Oct. 8, 1992, now U.S. Pat. No. 5,313,459.

BACKGROUND OF THE INVENTION

1. Field of the Invention

The present invention is generally related to communication systems and, more specifically, to private branch exchange systems including key systems, and methods for operating same.

2. Brief Description of the Pertinent Prior Art

A modern private branch exchange (PBX) system, in addition to facilitating communication among its lines and extensions must be capable of providing a number of special user services. For example, a PBX system must be capable of generating and routing, to each line and extension, a variety of standard and non-standard informational and supervisory tonal signals, such as, dial tone, audible ringing signal, etc., to provide each user with individualized call-status information. Furthermore, it is often desirable to supply special tonal signals, either with or without verbal messages, to assist callers in using the PBX and/or to provide information concerning their use thereof. Also, recently, it has also become desirable to provide such features as "music on hold", "voice mail", "station message detail recording" (SMDR), and "call forwarding." Also, given the needs of the modern office, the PBX system must have a conferencing feature for temporarily connecting a plurality of PBX system lines and/or extensions so that they may converse and/or exchange data simultaneously.

Conventional PBX systems exist which are capable of providing certain of the foregoing features. Typically, however, in order to be able to provide each of these special and particularly desirable features, conventional PBX systems incorporate application specific, dedicated hardware. For example, separate custom-made hardware modules are used in conventional systems to facilitate conference calling, generate tonal information signals and to distribute these signals to the plurality users (usually by means of a separate bus network), and to store and retrieve data (including informational and voice messages in "voice mail" systems).

A number of disadvantages result from the use of application specific circuitry to provide special user services in conventional systems. For example, the custom hardware used to generate tonal signals is only capable of producing a limited number of frequencies and amplitudes (power levels), and therefore, the tones which may be provided are invariably fixed depending on the specific type of custom hardware used within the system. This is especially unfortunate given the nature of today's telecommunications standards and global economy. Signalling frequency and amplitude standards differ from country to country, necessitating modifications of tonal signals to conform to each country's communications standards. Also, in order to effect these changes, significant and costly modifications must be made to the system's hardware, in order for the PBX system to be able to conform to these different telecommunication standards. In certain cases, the required modifications may be so extensive as to necessitate substituting an entirely different PBX system for the one currently in use.

Serious signal attenuation problems also plague conventional systems. For example, in a conventional system, the custom hardware used to generate tonal signals is connected, in parallel, to each of the output ports (via a distribution network). This arrangement causes the signal power distributed to each of the output ports to decrease proportionately along with the addition of each new output port and/or output line, necessitating the use of amplification and/or signal repeater circuitry distributed throughout the system.

Further problems may result when "voice mail" features are incorporated into a typical PBX system. Conventionally, the circuitry used to provide "voice mail" features comprise separate and distinct systems from the main PBX system. These separate systems are interfaced to the main PBX system via analog telephone lines and communicate with each other using one or more predetermined, standard signaling protocols (which may be, for example, combinations of hook-flashes, dual tone multiple frequency signals, or other protocols). Thus, each of the systems (the "voice mail" and main PBX systems) must be provisioned with necessary hardware to communicate using combinations of appropriate timing instructions and/or other protocol commands so as to synchronize their operations. This can result in the profound disadvantage that, if synchronization is lost between the separate systems, the overall PBX system will no longer function properly. Additionally, during initialization, the user of conventional "voice mail" systems may experience long periods of delay, since the communications protocol must be established and initialized among the separate systems prior to the beginning of data transfer to the voice mail system. Moreover, depending upon the amount of time required to initialize the voice mail and main PBX systems prior to transfer of data between the two systems, it may be impossible to implement a voice mail feature having meaningful utility. Also, since each of the systems is distinct from the other systems, each system must have its own individual control circuitry and administrative/control information data bases, and therefore, must be individually administered and maintained. These problems (the requirement for main PBX and voice mail system synchronization, and separate, distinct administrative/control means for each system) serve to significantly increase the overall system's maintenance costs, required administrative down-time, and electronic complexity.

Moreover, PBX "call forwarding" features currently available are quite limited in their capabilities. Typical "call forwarding" schemes merely re-route, after a predetermined amount of time, an incoming call from one line or extension of the PBX system to another predetermined extension. This can result in, inter alia, two major disadvantages. First, inconveniently, if the second extension is not answered, then, the caller must attempt to contact the desired party later by making a second call to the PBX system. Second, since a conventional PBX system's "call forwarding" circuitry may only redirect an incoming call from one PBX extension to another extension within the system, and not to an outside line remote from the system, individuals who usually would be at a given PBX extension (for example, in the workplace), but are currently at a location remote therefrom (for example, at home or commuting) cannot be reached by the PBX system.

Finally, given the complexity and large number of functions provided to callers by modern PBX systems (and the resulting complexity of instruction manuals describing these PBX systems), it has become necessary for PBX systems to automatically give callers special signals and/or messages to assist and/or prompt them in using and administering the system. Conventional PBX systems that provide such features do so by (1) providing LCD monitors and/or video displays to permit the system to display on-line "help" and other information to users, (2) employing a pre-recorded message delivery system substantially identical to conventional "voice mail" systems to transmit verbal information to users to "walk" them through accessing particular functions of the separate voice mail system, and/or (3) using special tone generating circuitry. None of these conventional techniques, however, is without significant drawbacks.

LCD and/or video monitors are expensive, and the on-line help features of PBX systems which use them cannot be accessed from locations remote from the PBX (e.g. home offices) absent provision of specialized electronics for that purpose. Also, typical pre-recorded messages are quite limited and are distributed via separate and distinct record/ playback systems similar to conventional "voice mail" systems. Thus, the problems and drawbacks associated with conventional messaging systems are similar (if not identical) to those of conventional "voice mail" subsystems. For example, one such problem is derived from the fact that significant periods of delay may be experienced during initialization of the main PBX and messaging systems. This delay is inconvenient and reduces the utility of the overall system.

Examples of conventional communications and/or private branch exchange systems include: U.S. Pat. No. 4,215,247, issued to Lambert; U.S. Pat. No. 4,280,216, issued to Zeitrag; U.S. Pat. No. 4,371,752, issued to Matthews et al.; U.S. Pat. No. 4,566,096, issued to Sarson et al; U.S. Pat. No. 4,701,948, issued to Molnar; U.S. Pat. No. 4,964,157, issued to Aoshima; U.S. Pat. No. 4,480,330, issued to Magnusson et al; and U.S. Pat. No. 4,460,807 issued to Kerr et al.

OBJECTS OF THE INVENTION

It is a general objective of the present invention to provide a PBX system that overcomes the problems and disadvantages associated with conventional PBX systems. More specifically, it is an object of the present invention to provide a digital private branch exchange system having integrated "conference calling", "voice mail," "music on hold," "call forwarding," and on-line system information delivery capabilities.

Further objectives of the present invention include providing a PBX system wherein call-status tones may be easily and inexpensively modified and wherein attenuation of supervisory signals distributed to the individual exchanges is substantially eliminated.

SUMMARY OF THE INVENTION

Accordingly, in one preferred embodiment of one aspect of the present invention, a digital PBX system is provided comprising a plurality of input and output ports. At least one input port and output port are recursively connected so as to provide at least one feedback receiving and transmitting port connected by a feedback path or bus means. Each of the plurality of input and output ports, including the feedback receiving and transmitting ports, are capable of transmitting at least one digitally encoded (for example, in pulse code modulation format) time division multiplexed (TDM) signal in at least one respective time slot. Control means is provided for controlling the PBX system, generating supervisory data corresponding to a plurality of supervisory tones, and for facilitating other functions of the system. Switching means is also provided for interconnecting any of the time slots of the ports. The supervisory data generated by the control means may be supplied to the feedback bus means so as to provide, in respective time slots, the supervisory data corresponding to the supervisory tones to any of the time slots of the ports, as desired. Additionally, data storage means may be provided, according to this aspect of the instant invention, for storing and retrieving supervisory data (generated by the control means), voice mail data, and digitized verbal instructional messages.

In another embodiment of this aspect of the present invention, a PBX system is provided that is essentially identical to the previously described embodiment, except that the feedback path is eliminated. The control means generates and transmits supervisory signals to the switch means. By appropriately controlling operation of the switch means, the supervisory data (and/or other data, such as voice mail and informational data) supplied to the switch means may be routed by the switch means to any of the time slots of the ports. Just as in the aforedescribed embodiment, data storage means may be provided for storing and retrieving supervisory data generated by the control means, voice mail data, and digitized instructional messages.

Advantageously, a PBX system according to the present invention is capable of providing an individual copy of each supervisory tone (in easily convertible digitally encoded format) to each time slot requiring the tone, and therefore, is not subject to the tonal signal attenuation that plagues conventional PBX systems. Furthermore, all of the special features (e.g., voice mail, instructional information, and music-on-hold), which according to the prior art were provided only by using separate and distinct subsystems, may be provided, according to the present invention, by the PBX system alone.

In a second aspect of the present invention, several novel processes are provided for operating a PBX system in order to provide special user services, like those described previously. For example, according to this second aspect of the present invention, a novel method for facilitating conference-type communication among three desired time slots of a PBX system is provided. According to one embodiment of this method intended for use in the preferred embodiment of a PBX system which includes a feedback bus, the desired conference call time slots are each connected to respective individual time slots of the feedback bus. The three respective time slots are then associated among themselves so as to form three unique pairs of time slots, in a manner that will be described more fully hereinafter. Each of the constituent time slots of each of the three pairs of time slots are then converted from their pulse code modulated format to a linear coded format, and next, the two time slots (now in linear coded format) in each pair of time slots are added together to form three respective linear sums respectively corresponding to each of the unique pairs of time slots. The three respective linear sums are then reconverted to pulse code modulated format and are supplied to additional respective time slots of the feedback bus. Finally, in this method, the additional respective time slots are connected by the switching means to the conference callers' extensions such that each caller's input time slot receives the sum of the other two callers' output time slots. Thus, each caller is capable of hearing, talking to and exchanging data with the other callers in the conference simultaneously. Advantageously, this method (like each of the other methods according to this aspect of the present invention, all of which will be described shortly) requires no control hardware other than that which is already present in the PBX system.

In a third aspect of the present invention, a method for implementing an improved "call forwarding" feature is provided. In this method the presence of a call being made to the PBX system is detected. The PBX system connects the incoming call to a caller-desired first extension. After a predetermined period of time has elapsed from the time that the incoming call was connected to the first desired extension without that call being answered at the first extension, the PBX system disconnects the incoming call from the first desired extension and successively re-connects it, after predetermined time periods have elapsed at each subsequent extension or remote location without the call being answered, to as many other successive subsequent predetermined extensions or remote locations as is desired. In one embodiment of this third aspect, if the extension or remote location sought to be connected to by the incoming call is busy or otherwise occupied, the call is connected automatically to the PBX system's voice mail system. Also in this embodiment, the extension or remote location receiving the call may be prompted to provide a password and/or predetermined string of digits and/or characters in order to provide greater data security. Advantageously, this embodiment of a novel call forwarding method according to the third aspect of the present invention frees the intended recipient of the call from having to answer the call in order to be able to receive its information, and further, permits forwarding of the call not only to a second extension within the PBX system but also to a location remote therefrom. Thus, an intended recipient of a call need not be present in the workplace to communicate using the PBX system, but rather may communicate using the PBX from any location accessible by ordinary public telecommunications networks.

In a fourth aspect of the present invention, various voice message processing methods are provided. In one method, according to this aspect of the present invention, for automatically helping a user at an extension of the PBX to use the system, verbal message storage means are provided in which a plurality of digitized verbal messages related to helping the user use functions performable by the system are stored. When initial user input is detected by the system, the system prompts the user (by transmitting an appropriate verbal message from the plurality of digitized messages stored in the storage means to the extension), to select a desired function to be assisted in using from a set of functions performable by the system. The message transmitted by the system to the extension informs the user as to the functions performable by the system and various subsequent input(s) required to be supplied by the user to command the system to instruct the user about those functions. The user's subsequent input(s) is detected by the system and at least one instructional message concerning the desired function(s) is transmitted to the extension. Other voice processing methods are also provided, according to this aspect of the present invention, and will be discussed in greater detail hereinafter.

Other features and advantages of the present invention will become apparent as the following Detailed Description proceeds and upon reference to the Drawings, wherein like numerals depict like parts and in which:

While the present invention will hereinafter be described in connection with preferred embodiments and methods of use thereof, it will be understood that it is not intended to limit the invention to these embodiments. On the contrary, it is intended to cover all alternatives, modifications, and equivalents as may be included within the spirit and broad scope of the various aspects of the present invention as defined only by the appended claims.

DETAILED DESCRIPTION OF PREFERRED EMBODIMENTS

Figure 1:
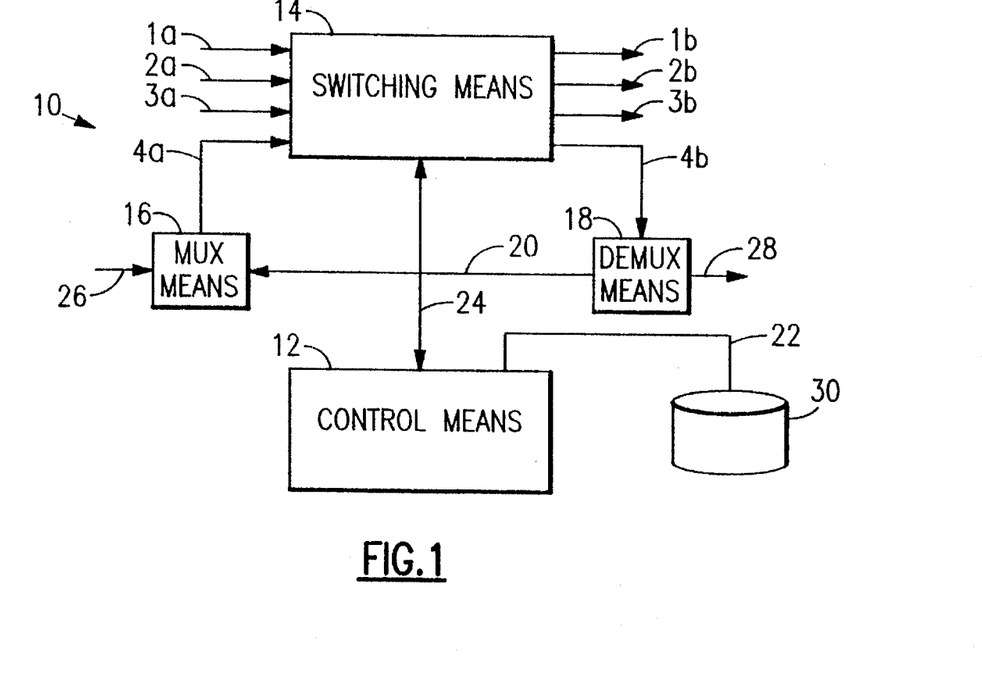
FIG. 1 is a functional block diagram of one embodiment of a PBX system made according to the first aspect of the present invention.
Figure 2:
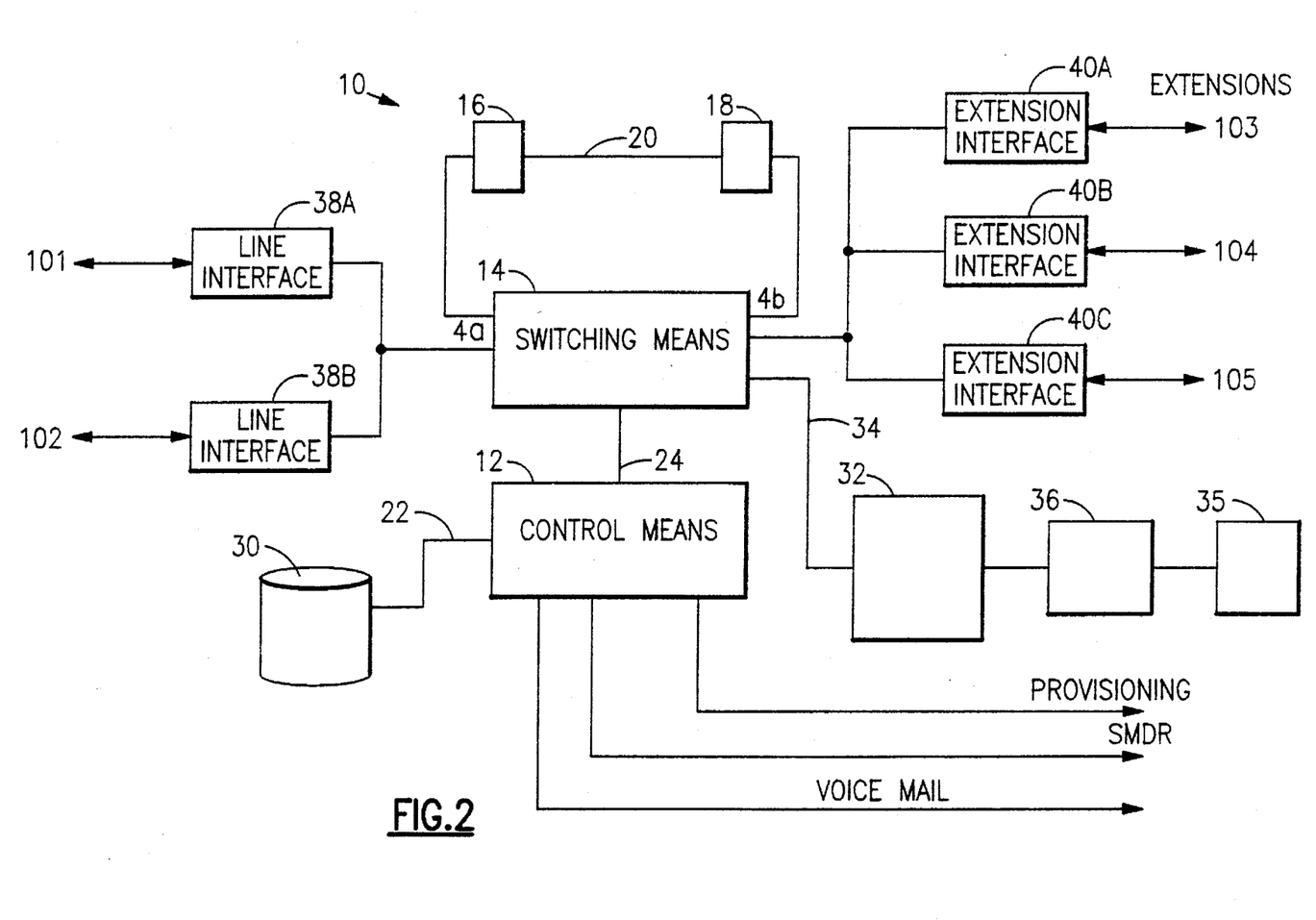
FIG. 2 is a system-level architectural block diagram of the embodiment of a PBX system shown in FIG. 1.

FIG. 1 shows the basic functional elements, in block diagram form, of one embodiment of a PBX system according to the instant invention. Functionally, PBX system 10 comprises switching means 14 which has the ability to interconnect any of the digitally encoded time division multiplexed signal time slots of its input 1a, 2a, 3a, 4a and output 1b, 2b, 3b, 4b, ports, respectively. Each of these ports 1a, 2a, 3a, 4a, and 1b, 2b, 3b, 4b, comprises conventional bi-directional multiplexed buses. That is, a time slot from an input port and corresponding output port (e.g. 1a and 1b) are used to provide a peripheral device extension for each device connected to the PBX system. As is well known to those skilled in the art, extension peripheral devices (not shown) may be connected to the switching means 14 via the ports to permit at least one time slot of the input ports to carry input data to the PBX system 10 and to permit data transfer from the system 10 (through at least one time slot of the output ports) to the extension peripheral device. Thus, if appropriately modified in obvious ways to those skilled in the art, a PBX system according to the present invention is able both to upload from and download data to an external peripheral device (not shown), such as a computer device. Also of course, as will be appreciated by those skilled in the art, the number of input and output ports illustrated in any of FIGS. 1–4, 6, and 8 should not be viewed as narrowing the instant invention to using only a particular number thereof, but rather, if appropriately modified in accordance with obvious techniques well known in the art, a PBX system according to the present invention may utilize any number of input and output ports. Also, each of the input and output ports usually services between 24 and 32 time slots; however, as in the case of the number of input and output ports, the number of time slots serviced by each input and output port may vary without departing from either the spirit or scope of the present invention.

Figure 6:
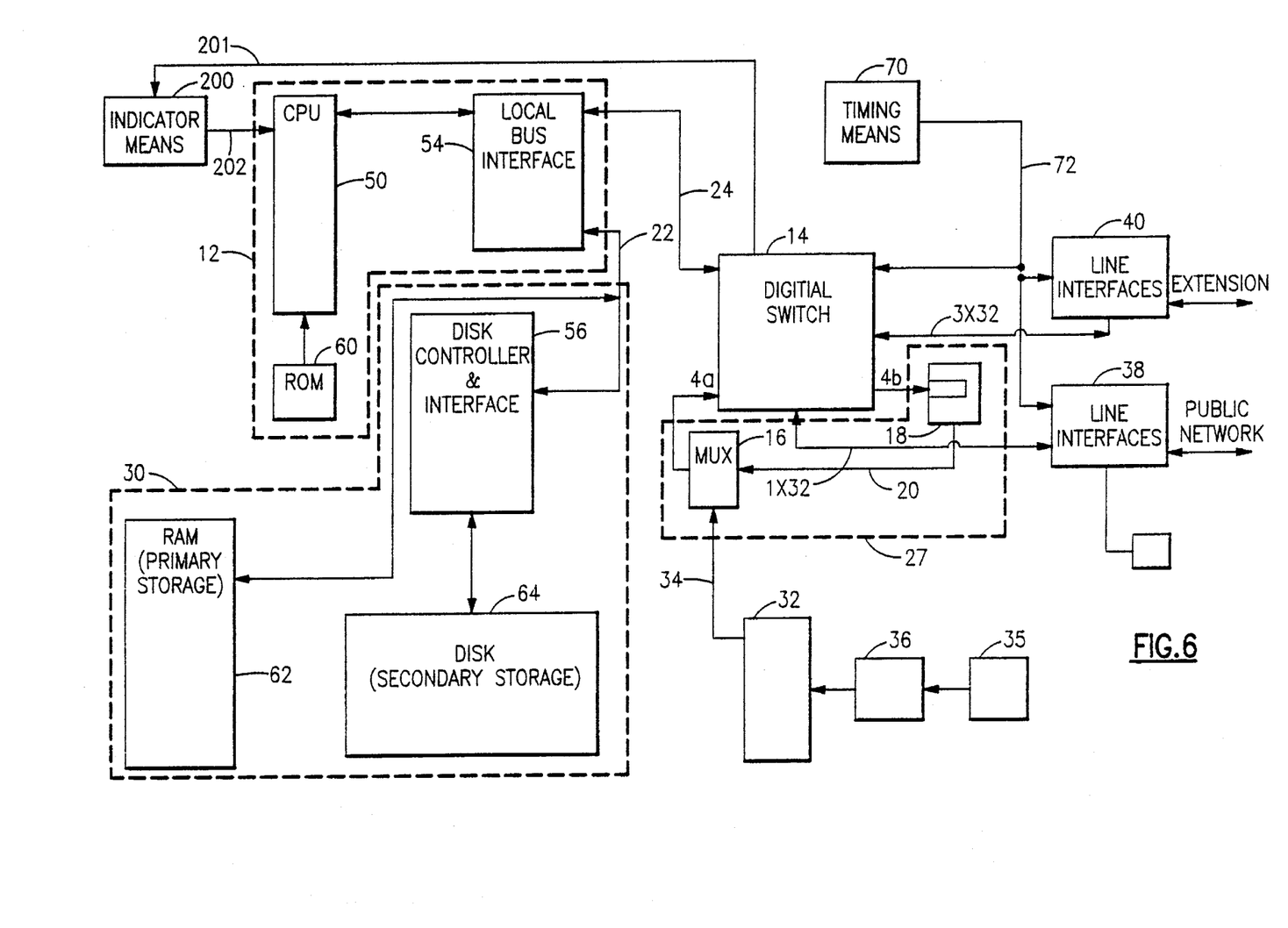
FIG. 6 is a more detailed schematic block diagram depicting component circuits of the embodiment of a PBX system shown in FIG. 2.

As depicted in FIG. 6, system 10 comprises a time division combining means (shown by dashed lines) 27. This combining means 27 itself comprises time division multiplexer means, including multiplexer means 16 and demultiplexer means 18, separate input means 26, separate output means 28 and feedback bus means 20. According to this embodiment 10 of the first aspect of the instant invention, the demultiplexer means 18 is connected to the switch means 14 by feedback transmitting port 4b, while also being connected to multiplexer means 16 via feedback bus means 20. Multiplexer means 16 is connected to feedback receiving port 4a which is in turn connected to switching means 14.

Control means 12 is provided having connections 22 and 24 which permit, respectively, control and communication with the storage means 30 and (via the switch 14) time division combining means 27. The control means 12 is able to control the operation of the PBX system 10 by, for example, transmitting control data and/or signals to the aforesaid elements of the system 10. Specifically, the transmission of the control data and signals make it possible for the control means 12, inter alia, to direct and control the switching means 14 in its assignment and interconnection of data into time slots. Furthermore, as will be described more fully hereafter, in this embodiment 10, the control means 12, by effectively controlling the time division combining means 27, the storage means 30, and the switching means 14, is able to provide desired special user features including, for example, conference calling capabilities, call forwarding, voice mail and music-on-hold features, and other features, including on-line system messaging.

System 10 of this embodiment preferably is connected to an outside public telecommunications network (not shown) by way of line interface circuits 38a and 38b, (collectively referred to by numeral 38 in FIG. 6). These line interface circuits 38a and 38b are connected both to the switching means 14 and to the input ports, respectively. Analog communication signals entering the system 10 from the outside network via lines 101, 102, are converted, preferably, into a bit stream having a conventional digital communications protocol, such as, pulse code modulation (PCM) format and also are time division multiplexed into time slots. In this way, analog signals entering the system 10 via lines 101, 102 are converted into a desired digitally encoded format and signals emitted by the system 10 of this embodiment, prior to reaching the input ports 1a, 2a are reconverted from this digitally encoded format to analog signal form to permit transmission through the public network. Of course, the line interface circuits 38a, 38b may permit conversion to and from any number of desired encoding formats, and, if either the system 10 or the public network are appropriately modified, may be eliminated entirely.

Likewise, extension interface means 40a, 40b, 40c, 40d, (collectively referred to as 40 in FIG. 6), in this preferred embodiment, permit conversion of analog signals to and from the encoded format to other desired formats. As in the case of the line interface means 38a, 38b the extension interface means 40a, 40b, 40c, 40d may permit signal conversion to and from an infinite variety of encoding formats, or may be eliminated entirely. Coordination and generation of the TDM time slots is preferably accomplished by timing means 70, which, preferably comprises an Intel 5C 090-60 chip.

The control means 12 (preferably comprising a conventional microprocessor 50, such as, e.g., Intel 80X86 local bus interface 54, and ROM 60), in addition to being capable of directing and interconnecting (by controlling the switching means 14, which preferably comprises a conventional MITEL MT8981DE chip) any of time slots of the input and output ports, is capable of generating and distributing appropriate supervisory tonal signals to the various ports. Two elements of the system 10 of this preferred embodiment are important to the capabilities of the control means 12. First, the system 10 is provided with feedback bus means 20. The control means 12, according to the instant invention, is capable of generating various supervisory tonal data signals corresponding to standard and non-standard call-status tones. The control means 12 transmits the supervisory data to the switch 14 via the control bus 24, the preferred construction of which will be discussed more fully, hereinafter. The switching means 14 then places the data in respective time slots of the feedback bus 20 and transmits the data through the feedback transmitting port 4b. The control means 12 determines which of the time slots of the feedback bus 20 is being respectively occupied by the data. The supervisory signals may then be recursively fed through the feedback bus 20 to feedback receiving port 4a. Thereafter, advantageously, the control means 12 may distribute supervisory data in the system 10 by controlling the switching means 14 so as to connect the time slots of the ports 1b, 2b, 3b to the data in the time slots of the bus 20, to permit transmission of data carried by the time slots of bus 20 to the port 1b, 2b, 3b. Thus, preferably, the supervisory data, prior to being connected to the time slots of the ports 1b, 2b, 3b, travel through the feedback bus 20 at least once. Of course, as has been described previously, the supervisory data, prior to reaching the extensions to which it has been connected undergoes conversion from its digitally encoded format to an appropriate analog format by the extension interface means 40a, 40b, 40c, 40d.

A fuller explanation of the functioning of the time division combining means 27 and the feedback bus means 20 in this preferred embodiment 10 will now be made. Supervisory data (corresponding to respective supervisory tones) generated by the control means 12 are transmitted through the I/O bus 24 via bus interface means 54 to the switch means 14 and are assigned to predetermined, unique, respective time slots by the timing means 70 and the switch 14. Thence, the data (in respective time slots) are fed through demultiplexer means 18, after being transmitted through feedback port 4b, and travel through bus 20. Thereafter, the data are inputted to feedback port 4a, enabling the switch to connect the data to the other ports (and time slots thereof) 1b, 2b, 3b, 4b) as needed. Time slots of bus 20 are multiplexed in time by means of the input multiplexer means 16. Since the switching means 14 is capable of interconnecting any of the time slots of the ports, any supervisory signal may be distributed to any desired extension by appropriate control of the switching means 14 by the control means 12.

Figure 3:
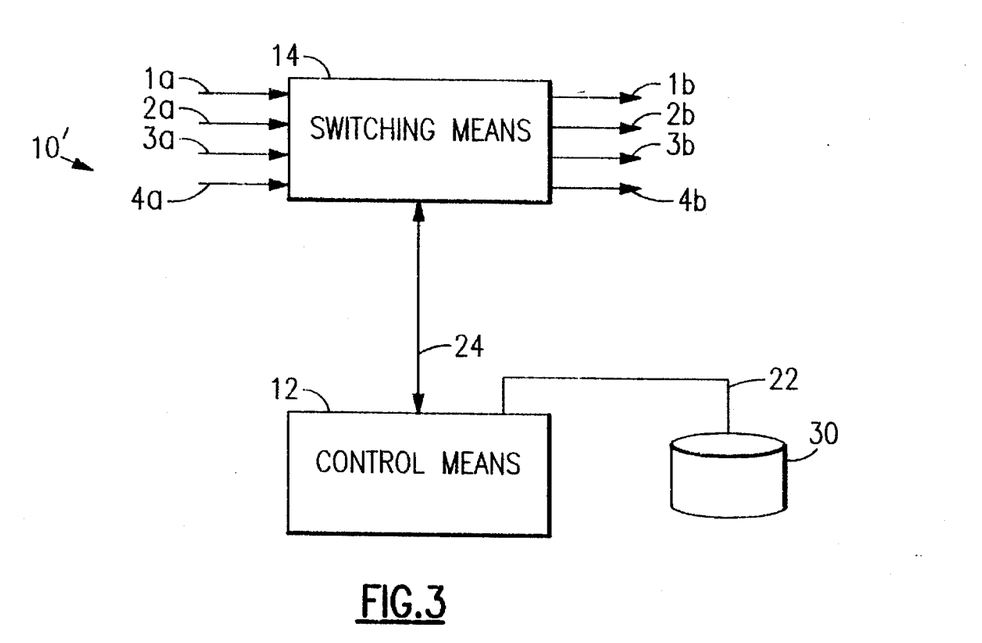
FIG. 3 is a functional block diagram of another embodiment of a PBX system made according to the first aspect of the present invention.
Figure 4:
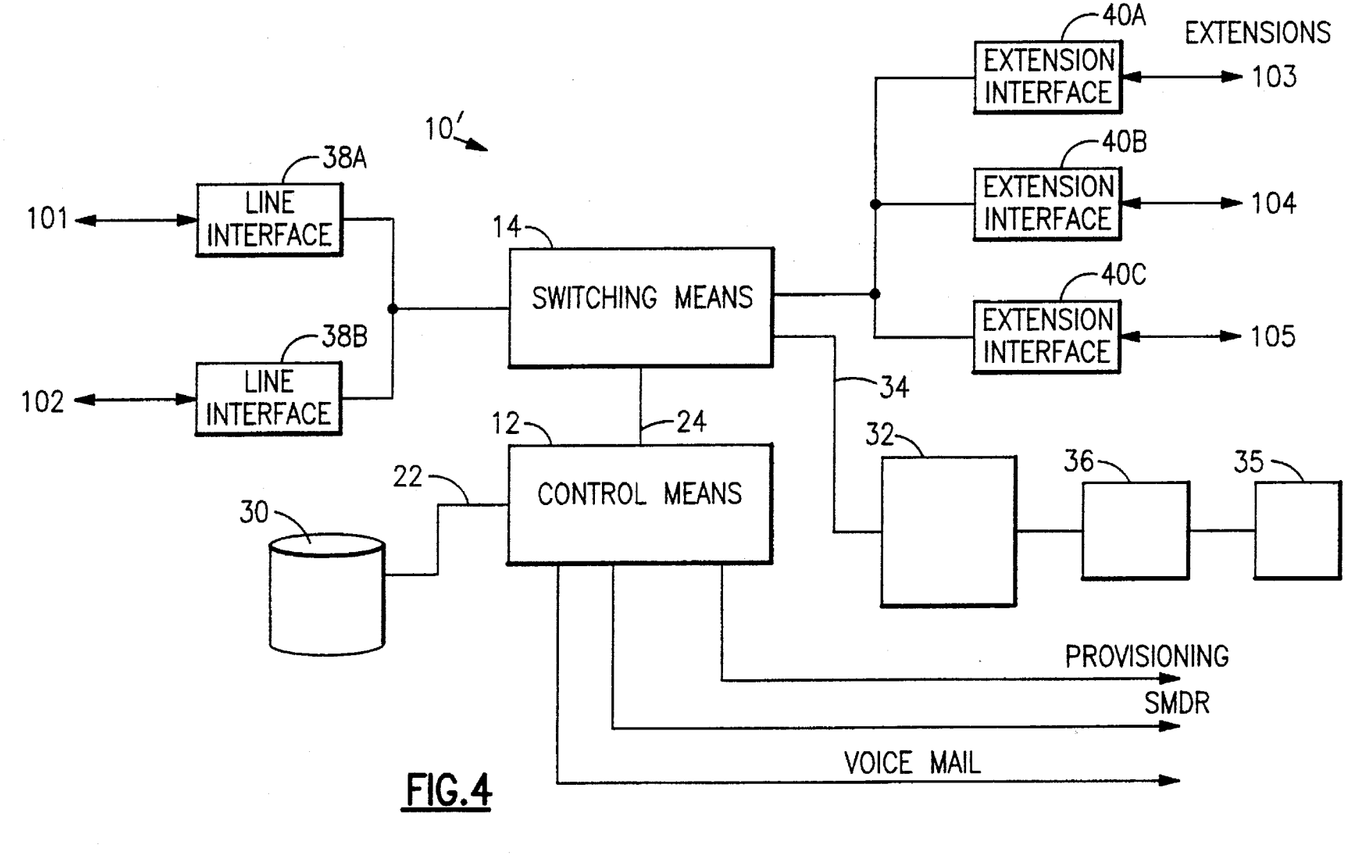
FIG. 4 is a system-level architectural block diagram of the embodiment of a PBX system shown in FIG. 3.
Figure 8:
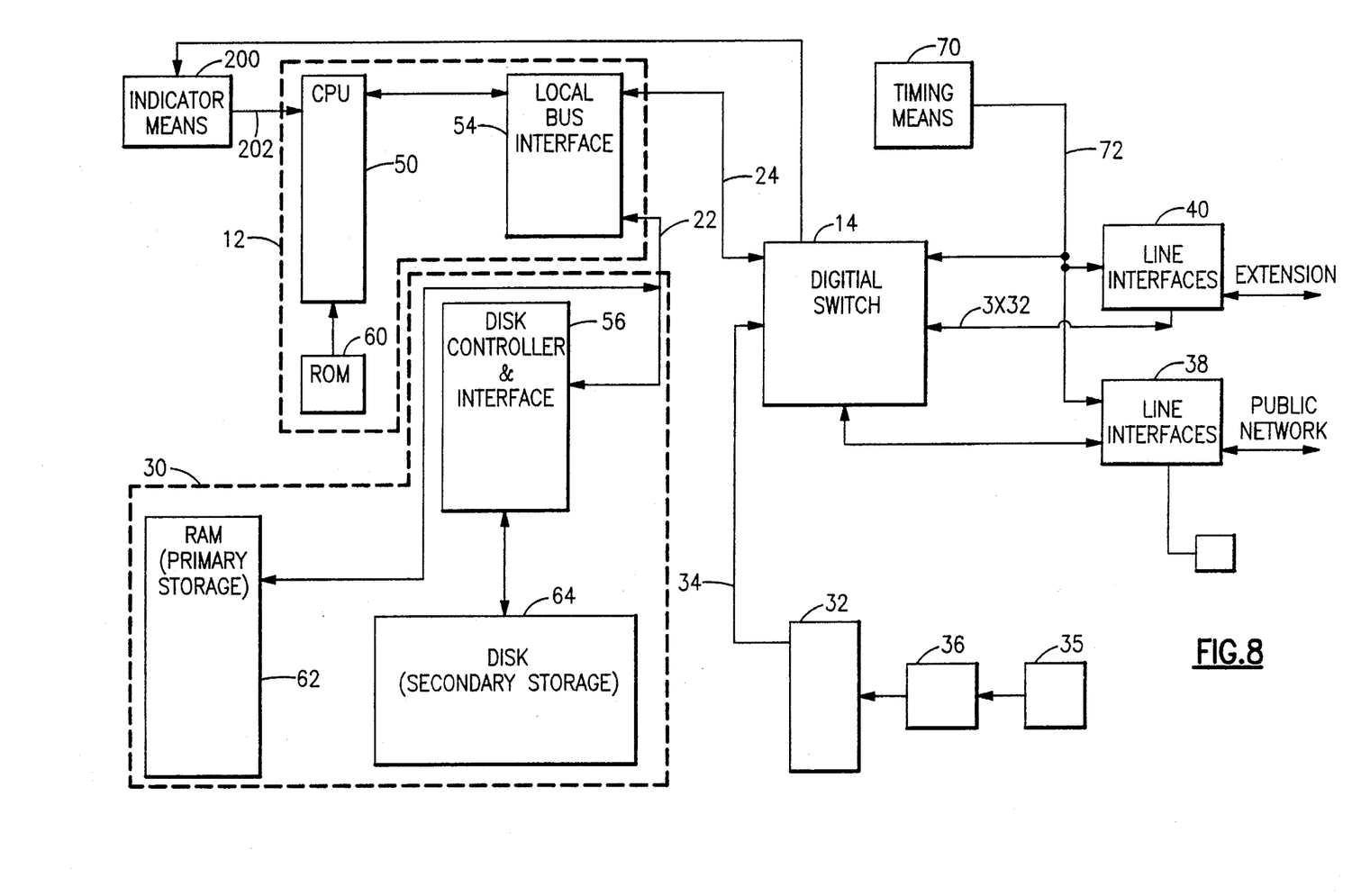
FIG. 8 is a more detailed schematic block diagram depicting component circuits of the embodiment of a PBX system shown in FIG. 4.

Turning now to FIGS. 3, 4, and 8, a second preferred embodiment of a PBX system according to the present invention will now be discussed. In general, the elements and operation of preferred embodiment 10' are identical to those of preferred embodiment 10, with the exception, that feedback bus means 20 and time division combining means 27 (which are present in embodiment 10) are not found in the second embodiment 10'.

Turning now to a discussion of the second aspect of the present invention, complex call-status or supervisory signals (with or without periodic cadence) may be generated in the first embodiment 10, simply and effectively, by using the switching means 14 and the novel feedback bus means 20. According to this embodiment (for use in connection with the first embodiment 10) of the second aspect of the instant invention, feedback bus 20 time slots carrying supervisory data and bus 20 slots carrying silence data are alternatively cross connected to time slots for carrying the complex data. Complex supervisory signals thus generated are transmitted by the feedback bus 20 in their own, additional respective individual time slots. If desired, by predeterminately selecting the amount of time that silence data and supervisory data are connected to the complex supervisory data time slot, the complex data may be made to have periodic cadence. This complex data, either with or without periodic cadence, may then be connected to any time slot of the ports of the system by the switch 14, in the manner that has been described previously.

More specifically, in order to generate complex supervisory data according to this embodiment, the control means 12 (by controlling the switching means 14) may cause supervisory data entering the switching means 14 at feedback receiving port 4a to be connected at the feedback transmitting port 4b to a desired time slot of the bus 20 dedicated to carrying complex supervisory data. The control means 12 may next cause the switching means 14 to connect a time slot carrying silence data (entering at the receiving port 4a) to be cross-connected at the transmitting port 4b to the desired complex data time slot of the bus 20. If periodic cadence for the complex data is desired, the control means 12 may cause this connection of the silence data time slot to the complex data time slot of the bus 20 to be for a predetermined time and to re-occur at predetermined time intervals, however, it will be appreciated that complex signals without periodic cadence (that is, having arbitrary cadence or consisting of combinations of supervisory signals without a silence signal) may be generated according to this aspect of the present invention without departing therefrom. The complex supervisory signals thus formed may then be distributed to any extension in the system 10, in the manner previously described.

Advantageously, by using this embodiment of a call-status signal distribution method, no signal attenuation results, unlike in the prior art. This is due to the fact that, among other things, in the instant invention, each time slot may be made to receive an individual copy of desired supervisory data which may then be converted into an individual analog wave form of the signal. Thus, as many extensions as are needed may be assigned by the control means 12 and connected by the switch 14 to a bus 20 time slot containing a given supervisory or complex signal without signal volume degradation.

Alternatively, in the second 10' embodiment, control means 12, generates various supervisory tonal signals corresponding to standard and non-standard call-status tones. The control means 12 transmits the supervisory data to switch 14 via control bus 24. Switching means 14 then directly places the supervisory data in the time slots of the input and output ports to be connected to the supervisory signals. Complex supervisory data in this embodiment 10' are generated by control means 12 which then supplies the complex data to the extensions of the system 10' to receive the data via switching means 14. More specifically, control means 12 generates supervisory data corresponding to part (for example, a busy tone) of the complex data and transmits that data to the switch. The switch connects the supervisory data to the desired extension (that is, the extension desired to receive the supervisory data). The control means then generates other supervisory data, corresponding to the rest (for example, silence data) of the complex data, which other data is then connected to the extension to receive the complex data. Since the control means 12, in this embodiment 10 is able to directly generate the complex supervisory data, no feedback bus 20 is needed to perform this function, as in the first embodiment 10. In order to generate complex supervisory signals having cadence, the control means transmits the supervisory data making up the complex data at predetermined time periods corresponding to the cadence desired for the complex data.

Figure 5:
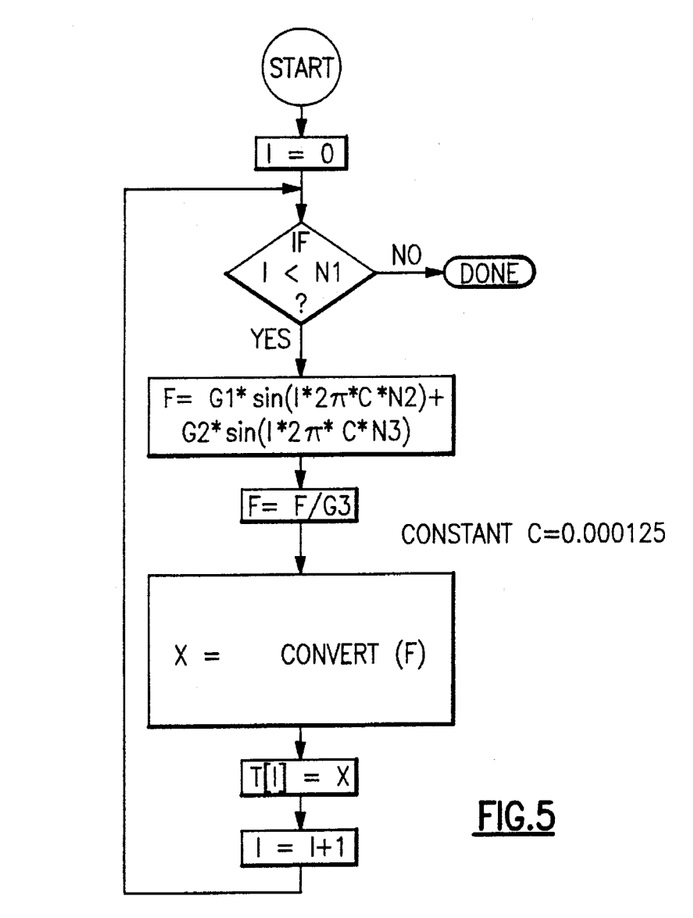
FIG. 5 is a flow chart illustrating the steps of a preferred embodiment of a method for generating supervisory signals (according to the second aspect of the present invention)

Continuing the discussion of the second aspect of the instant invention, preferred methods for generating supervisory data by the control means 12 will presently be described. In connection with this discussion, reference should be had to FIGS. 6 and 8. In both preferred embodiments of the system 10, 10', the control means 12 comprises a microprocessor 50 having access to, and control of, a circular memory buffer (not shown) comprised within storage means 30. Storage means 30 preferably comprises, a circular memory buffer contained in RAM 62, secondary storage means 64 (e.g., a hard disk drive) interfaced to the bus 24 by standard disk controller means 56 (which may be a SCSI, RLL, IDE, or other type of standard drive controller/interface means), and/or indicator means 200 (which preferably comprises Intel 5C090 chip for generating processor interrupts and/or Direct Memory Accessing Signals for facilitating, among other things, transfer of data in the system. The microprocessor 50 generates a series of data values and stores these values in the circular buffer located in storage means 30 after transmitting them through the memory bus 22. The storage means 30 may either contain a plurality of circular buffers in RAM 62, each for containing respective call-status supervisory data corresponding to respective tones, or a single memory buffer appropriately segmented into individual storage segments for storing said supervisory data therein in accordance with well known conventional memory management techniques. The microprocessor 50 is programmed so as to implement a simple and efficient tone generating process, the steps of which are depicted in FIG. 5. As shown in FIG. 5, numerical values represented by $F_I$ are converted into an encoded form thereof, and are then stored respectively in memory locations of the circular buffer T[I], where parameter I represents a given iteration step for generating supervisory signals. The numerical value $F_I$ is assigned a value equal to $(G_1 * \sin(I*2pi*C*N_2)+G_2* \sin(I*2pi*C*N_3))/G_3$, wherein each of the variables $G_1$, C, $N_2$, $G_2$, $N_3$, and $G_3$ correspond to values needed to generate each type of status tone, and will thus vary depending on the signal to be generated. Also, the variables I and $N_1$ are iteration values and depend upon the size of the buffer T[I] and location within the buffer T[I] of the value $F_I$ being generated. Using readily available publications of standard AT&T information, it has been determined that, in order to generate a standard U.S. dial tone, $N_2$ must be set equal to 350; $N_3$ must be set equal to 440; $G_1$ must be set equal to 1; $G_2$ must be set equal to 2; and $G_3$ must be set equal to 3. Data values $F_I$ for generating a standard U.S. busy tone in this embodiment of the system 10 are also produced according to the above equation, with the exception that the variables $N_1$, $N_2$, $N_3$, $G_1$, $G_2$, and $G_3$, are set to 400, 480, 620, 1, 2, and 3 respectively. Lastly, to generate the audible ringing tone, data values $F_I$ are produced that satisfy the above equation, except that the variable $N_1$, $N_2$, $N_3$, $G_1$, $G_2$, and $G_3$ are set to 200, 440, 480, 1, 2, and 3, respectively. Of course, as will be appreciated the above equation, by selecting and substituting appropriate values for each of the above variables, may be used to produce data for generating any type of arbitrary supervisory signal. The $F_I$ values thus generated for each of the supervisory signals are stored appropriately in the circular buffer T[I] after having been converted to PCM format, using commonly-known and readily available algorithms. Also, it will be appreciated that, if desired, the data values $F_I$ may be generated by the control means 12 in real-time and need not be stored in the storage means 30. Alternatively, the values $F_I$ may be pre-generated and permanently stored in a ROM device or generated at system 10, 10' boot-up and stored in storage means 30, without departing from the instant invention.

In the first embodiment 10 of a PBX system according to the present invention, the supervisory data corresponding to respective supervisory tones are supplied to the feedback bus 20 via the control means 12 through the control bus 24. The microprocessor 12 may be provided with an appropriate interrupt service routine triggered by, for example, indicator means 200, at periodic time intervals (e.g., 125 microseconds) and values from the buffer may be read from the storage means 30 and placed onto the I/O bus 22, and from there, placed onto the control bus 24 by the control means 12. Thence, the control bus 24 supplies these data to the switch 14 to place them onto the feedback bus 20. Once the various data values for the supervisory signals have been placed in respective time slots of the feedback bus 20, the control means 12 may be used to connect these data values to the ports. Also, by periodically cross-connecting the various bus 20 time slots with each other and/or a bus 20 time slot dedicated to silence, in the manner described above), various complex supervisory signals having periodic cadence may be generated.

Alternatively, in the second 10' preferred embodiment of a PBX according to present invention, the supervisory data are also supplied to the switch 14 via the control means 12 through control bus 24. The switch 14 then connects the supervisory data to desired time slots (as determined by the control means 12) of the ports. Complex supervisory data may be generated in the manner described previously.

In another method according to the second aspect of the present invention, "music on hold" may be implemented. In the first embodiment 10 of a PBX according to the present invention, an interface circuit 36 connects an external audio source 35 (which preferably comprises a conventional analog music source) to an encoding device 32 (all of conventional construction). The encoding device 32 converts analog audio or music signals supplied by the audio source 35 into a digitally encoded format thereof. Preferably, as has been described previously, this digitally encoded form takes a form of a PCM-type encoding. Alternatively, of course, digitally encoded audio signals may be stored in storage means 30 or some other digital storage device (either in PCM format or some other format and converted as needed). The encoded audio data is then time division multiplexed and transmitted to the switch 14. In the first embodiment 10 of a PBX according to the present invention, the data are then connected to at least one dedicated time slot reserved solely for such data of the feedback bus 20. Alternatively, in the second embodiment 10', the data are directly connected by the switch 14 to at least one time slot of the ports desired to receive music. Advantageously, unlike the prior art, the incorporation of the music on hold feature of the instant invention requires no additional control hardware other than that already present in the systems 10 and 10'.

Also, no additional hardware must be added to systems 10 and 10' to implement the voice mail feature according to the second aspect of the instant invention. In the first embodiment 10 of a PBX according to the present invention, incoming voice mail messages to be recorded may be transmitted by the switching means 14 from any of the time slots of the input ports to a dedicated time slot (voice record channel) of the feedback bus 20. Thence, the data are inputted to port 4a. From there, the voice data may be transmitted through the system bus 24 to the control means 12. Thence, the data may be transmitted to either an external data storage device (not shown) via the voice mail bus or may be stored in storage means 30 after being transmitted through I/O bus 22. Of course, inasmuch as the storage means 30 may comprise both secondary 64 as well as primary storage devices 62 the information transmitted through I/O bus 22 may first be stored in primary storage means 62 (e.g., random access memory) until a sufficiently large block of voice data is stored therein and, thereafter, may be dumped into secondary storage means 64 for future reading by the control means 12. Outgoing voice mail may be read either from the separate storage device (not shown) or from the storage means 30 by the control means 12. The data is then transferred to the switch 14 so as to be placed into a second dedicated voice time slot (voice replay channel) of the feedback bus 20, and from there the stored voice mail data may be transmitted by the switching means 14 to any extension requesting the replay of the voice mail message.

Alternatively, in the preferred embodiment of the voice mail system for use in the second embodiment 10', voice mail messages to be recorded are transmitted by the switching means 14 from the time slots of the input ports to the control means 12. Thence, data are inputted either to an external data storage device (not shown) via the voice mail bus, or may be stored in storage means 30 after being transmitted through I/O bus 22. Just as in the first preferred embodiment 10, inasmuch as the storage means 30 may include both secondary 64 as well as primary storage devices 62 the information transmitted through I/O bus 22 may first be stored in primary storage means 62. Outgoing voice mail may either be read from the separate storage device (not shown) or from the storage means 30 by control means 12. Data are then transferred to the switch 14 and transmitted to the extension requesting replay of the voice mail message.

Thus, advantageously, a PBX system 10, 10' according to the instant invention does not require special combinations of dedicated timing instructions to synchronize its voice mail and music on hold features with the operation of the main system since all of these functions are controlled by the control means. Moreover, no additional, special control hardware or transmission lines are required to implement a voice mail feature according to the present invention. Finally, inasmuch as the voice mail feature is controlled using the existing control means for the system, and requires no separate provisioning, the entire system may be administered collectively, solely by the programming of control means 50, significantly decreasing system maintenance costs, required administrative down-time, and complexity.

Also, according to the present invention, a method is provided for facilitating conference-type communication among three desired time slots of ports of a PBX system. According to one embodiment this method for use in the first 10 embodiment, the desired output time slots of the desired extensions are each connected to respective individual time slots of the feedback bus 20 by the switching means 14. The three respective time slots are then associated among themselves as three unique pairs of time slots consisting of two time slots each. For example, if the three time slots to be associated are designated a, b, and c, respectively, the three unique pairs resulting from their association would be given respectively by: a and b; b and c; and, a and c. Each of the time slots a, b, c are then converted from their coded format (as stated previously, preferably, pulse code modulated format) to a linear coded format by the control means 12. For example, the conversion from the coded format to the linear format of each of the time slots (that is the signals of each of the time slots) may comprise the removal of format masking (for example, in the case of a PCM code, logically XORing the data of the channels a,b,c, with the value 55 hex and the removal of Mu or A-law encoding). Conventional methods for conversion of PCM coded data to linearly encoded data are well known in the art, and any conventional PCM to linear coding conversion method may be used in the method presently being described, without departing from the spirit or scope of the instant invention.

After converting each time slot a, b, c, each associated pair (a and b; and c; and, a and c) of linearly converted time slots are added together, to form three respective linear sums of the three unique pairs of time slots previously associated. These three respective linear sums are then converted into pulse code modulated format and are supplied to additional respective time slots of the feedback bus 20. Of course, as in the case of the conversion of the time slots into linear coded format, the present conversion from the linear coded format into pulse coded format may comprise well known algorithms for doing same, without departing from the instant invention. The three converted sums are then supplied to additional respective time slots of the feedback bus 20. The control means 12, by appropriate manipulation of the switching means 14, may then connect each of the conference caller's input time slots to each of the sum signals, respectively, so that each of the callers' input time slots receives the sum of the other two callers' output time slots. Advantageously, this permits each caller to hear, communicate with, and/or exchange data with each of the other callers in the conference.

Alternatively, in an embodiment of the method for use in the second embodiment 10', control means 12 samples the three unique pairs of time slots at predetermined time periods. The sampling may be triggered by indicator means 200, which generates interrupt signals at predetermined time intervals. Data sampled from the time slots of the three unique pairs are then converted from their coded format to a linear coded format by the control means 12. After converting the time slots sampled, they are added together to form respective linear sums which are then reconverted to pulse code modulated format and are then supplied via the switch to the third non-associated time slot (that is, the time slot that was not part of the unique pair sampled). The foregoing process is then repeated for each of the other two unique pairs of time slots. Thus, each caller is permitted to hear, communicate with, and/or exchange data with each of the other callers of the conference.

As will be readily appreciated, no special control hardware is required to implement this three-way conference calling feature according to the second aspect of the present invention. This results in substantial cost savings in the implementation of this feature. Furthermore, as will be readily appreciated, the method of this aspect of the present invention may be extended to any number of conference callers, in simple and obvious ways to those skilled in the art, so that any number of parties may be permitted to communicate simultaneously.

Preferably and advantageously, both embodiments of this conference-calling method also comprise the generation and utilization by the control means of a look-up table matrix array stored in the storage means containing all possible PCM data values for caller output channels and their value after linearization, summing, and reconversion to PCM. The control means may then index into the two dimensional look-up table array using, as indexes, the respective data values in PCM code of each of the two associated caller output time slots to find their PCM sum value after linearization which then may be sent to the input time slot of the third non-associated extension or remote location.

Advantageously, this arrangement permits the sum of the two channels to be sent to the third extension's (or remote location's) non-associated input channel without the need to convert the two channels to and from the linear coded format. Of course, the conference calling method previously described need not use such a look-up table, but may rather incorporate the use of conventional digital signal processing techniques to permit the microprocessor 50 to decode, sum, and re-encode the time slots of the extensions in real time, to permit conference calling according to the instant method. The choice of whether the look-up table or the digital signal processing approach to facilitate conference calling is used will be dependent upon the capacity and speed of the storage means 30 and/or processing power of the control means 12.

Turning to the third aspect of the present invention, a method for implementing an improved call forwarding feature which may be used in both embodiments 10, 10' of a PBX system according to the instant invention is provided. One embodiment of the method according to this third aspect will be discussed in connection with FIGS. 3 and 4. In this embodiment of the forwarding method of the present invention, the presence of a call being made to the PBX system is detected, preferably, using conventional ringing voltage detector means included in interface means 38a, 38b. A signal is then supplied by the detector means to the control means 12. In response to the signal supplied by the detector means, the voice mail system and method previously described may be actuated in one embodiment of this method, and the incoming caller is prompted by a recorded message retrieved from the storage means 30 (or from alternative storage means, not shown) to supply a desired extension. Any conventional method may be used to accept the extension supplied by the caller (e.g., a dual-tone multi-frequency-type method and/or hook-flash signalling methods). The control means 12 then uses the extension number supplied to cause the switching means 14 to connect the incoming call to the supplied extension time slot. Of course, the caller may not be required to supply an extension number, but rather, that number may be stored in the storage means 30 and retrieved by the control means 12, or may be supplied using other means. After a predetermined period of time has elapsed from the initial time that the incoming call was connected by the switching means 14 to the first desired extension without that call being answered, the system 10 (or more particularly, the control means 12) causes the switching means 14 to disconnect the incoming call from the first desired extension, and the incoming call is then connected by the control means 12 (via the switching means 14) to a different, second predetermined extension or outside telecommunications line of the public network (not shown). This new extension (or outside line) may be predetermined and associated with the first extension in memory 30 (using conventional memory association techniques), so that when needed, the control means 12 is able to connect the incoming caller to that second extension based on the first extension supplied. Advantageously, the second predetermined extension need not be connected to the physical ports of the system 10, 10', but may rather be located remote therefrom (e.g., at a location accessible through a public network). As will be appreciated, the associative memory space used by the control means 12 to facilitate forwarding of the incoming calls may contain more than one such successive forwarding extension (and also, may include any number thereof), depending upon the capacity of storage means 30 and the particular application to which the system is put. Advantageously, outside forwarding of the incoming call is accomplished by associating in the associative memory of the storage means 30, with the desired extension, an outside number for use with the public telecommunications network. Means for dialing up and connecting the public network to a port (preferably included in the line interface means 38) controlled by the control means 12, which (after reading the outside number from storage means 30) transmits the number to the dialing and connecting means. The switch means 14 then connects the caller to the outside line of the public network. In a variant of the foregoing call forwarding method according to this third aspect of the present invention, after the answering of the second (or later) extension or remote location, the control means 12 may actuate an authorization request prior to permitting data or message exchange between the caller and the extension, by using the voice mail message system of the instant invention. The one answering the call at either the extension or the remote location may then be prompted to supply a password and/or predetermined string of digits within a predetermined amount of time. The control means 12 may then evaluate the numbers and/or password supplied from the extension or remote location against the predetermined values stored in the storage means 30 therefor. If a correct numerical string and/or password has been entered, the incoming call and the extension or remote location may be permitted to exchange data or transmit messages, while, if not, the incoming call may be directed to the voice mail system by the control means 12, and data supplied by the incoming call may be stored into storage means 30 for later recall by either the intended recipient or by another alternative recipient having the correct password (e.g., a secretary). For example, if, after a predetermined amount of time, either the extension or the remote location do not answer the incoming call, the incoming call may be directed by the control means 12 via the switching means 14 to the storage means 30 or external storage (not shown), according to the voice mail method, and data supplied by the incoming call may be stored in storage means 30 for later recall according to the voice mail feature of the instant invention.

Other novel methods for using a PBX 10, 10' made according to the present invention will now be presented. One such method is for automatically assisting a user at a given extension of the system in using and/or learning about functions performable by the system (for example, voice mail, call forwarding, and/or system administration functions such as, configuring the input and output ports of the system and assignment of extensions thereof). According to one preferred embodiment of this method, a plurality of pre-recorded verbal instructional messages is stored in the storage means 30 and/or special external verbal message storage means (not shown). As will be appreciated, such digitized verbal instructional messages are infinitely variable, however, examples of such messages are listed in Table 1. Upon detection of initial user input (which may comprise, for example, the entering of a predetermined key sequence on a telephone keypad, the initiation of a hook-flash signal by the user, use of dual tone multi-frequency signals or other forms of conventional signals), the system 10, 10', and more specifically, the control means 12, transmits an appropriate message taken from the plurality of messages stored in the storage means to the user at the extension. This appropriate message prompts the user to select a desired function to be assisted in using and/or to learn more about, from a predetermined set of functions performable by the system, and recites subsequent input(s) (associated with each of the functions in the set) required to be supplied by the user to the system to effectuate this assistance. For example, as shown in Table 1, the subsequent input associated with the extension configuration function is *6. Once the user has determined which function of the system he desires to learn about and/or implement, he may enter the appropriate, subsequent user input associated with that function, which subsequent input is then detected by the system. As was the case with the initial user input, the subsequent user input may take many forms, but preferably comprises a series of numeric keypad inputs from a standard telephone, one or more hook-flash signals, and/or use of dual-tone multi-frequency signalling methods, depending upon programming of control means 12 and the prompting message supplied to the user. Once the system detects the subsequent user input, an instructional message about the desired function is transmitted from the storage means to the user. This verbal instructional message provides assistance and/or information to the user concerning how to access and/or use the desired function provided by the PBX system 10, 10'. Optionally, according to this method, the system 10, 10', prior to providing instruction on how to utilize the function desired by the user, may prompt the user to supply a predetermined password. In this way, various important system administrative functions may be protected from tampering. Also, optionally, the above process steps may be repeated until the user enters a predetermined key sequence or other type of signal indicating that the user no longer wishes to be assisted and/or instructed in using the various features and/or functions performable by the system. Also alternatively, at the end of the instructional message (or indeed, anywhere within the steps of the method outlined above) the user may be prompted by the system with a message intended to determine whether the user wishes the system to perform the desired function.

Also according to this aspect of the present invention, various call-status verbal messages may be supplied to the user of the PBX system 10, 10'. For example, after a predetermined amount of time has elapsed after placement of a call, the system may send the user placing the call a message indicating the status of the call, depending upon whether the extension being called is busy, not being answered, or being automatically forwarded to another extension, and so forth.

Figure 7:
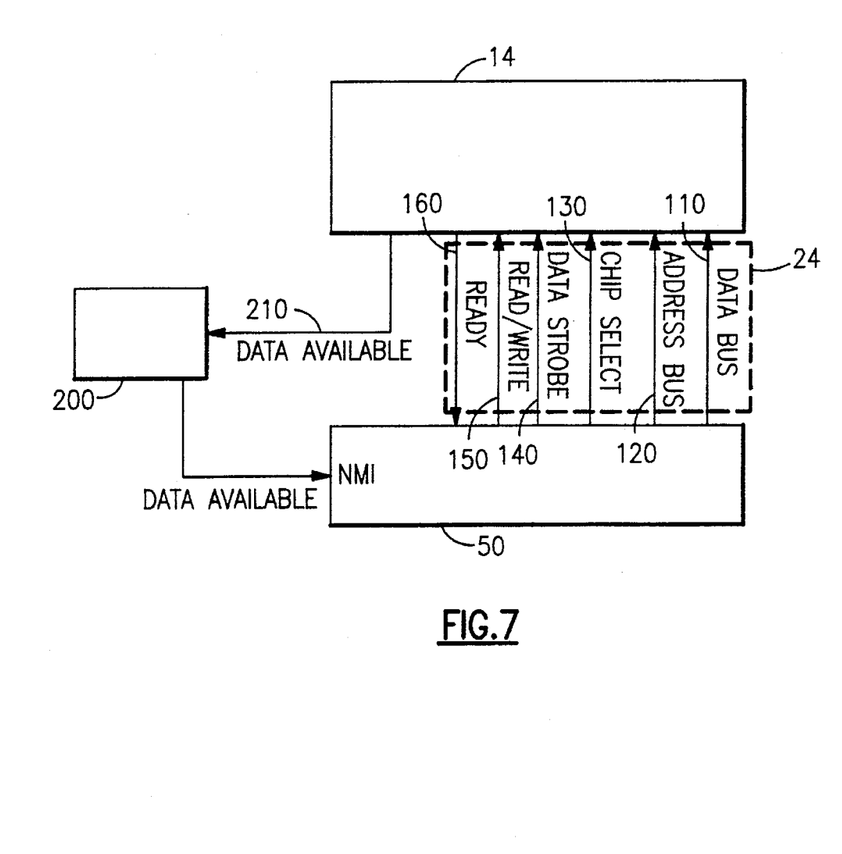
FIG. 7 is a schematic block diagram of a preferred embodiment of an interface for connecting the control means to the switch means in a PBX system made according to the present invention.

Turning now to FIG. 7, a preferred construction of control bus 24 will now be described. For the sake of simplicity, only elements essential to a discussion of control bus 24 are shown in FIG. 7. As has been stated previously, control bus 24 permits transfer of both control signals to the switch and transfer of various data (e.g., supervisory, voice mail, informational data, etc.) between the switch and control means. In this embodiment, As shown in FIG. 7, the preferred embodiment of control bus 24 comprises bi-directional data bus 110, address bus 120, chip select line 130, data strobe line 140, read/write line 150, switch ready indicator 160, and data available line 210 interfaced to control means 50 via indicator means 200.

In operation, in order to transmit data from the control means 50 to the switch 14, control means 50 asserts select line 130, places an appropriate address onto address bus 120, appropriately sets read/write line 150 and data strobe 140 to fix the data transmission direction of the data bus 110. Control means 50 then places the data to be sent to the switch 14 onto data bus 110. After transfer of the data to the switch 14 (that is, after switch 14 has received the data), switch 14 appropriately sets ready line 160 to terminate transfer of data from control means 50. When data is available from switch 14 for transfer to the control means 50, the switch 14 indicates this condition by setting the data available line 210. This causes indicator means 200 to generate a non-maskable interrupt signal which is sent to control means 50. The control means 50 then activates the appropriate interrupt handler routine for receiving data from the switch 14. Control means 50 then indicates its readiness to receive data from the switch 14 by placing an appropriate address onto the bus 120, activates switch select line 130, and by appropriately setting the read/write line 150 and data strobe 140 to indicate a "read" operation. The switch 14 then places the data to be sent to the control means 50 onto the data lines 110. After transfer of the data to the control means 50, switch 14 terminates the operation by asserting ready line 160.

Various changes may be made in the above-described invention without departing from the spirit and scope thereof. For example, call book-keeping (SMDR) information of the system 10, 10' may be gathered by the control means 12 and stored in the storage means 30. At periodic time intervals (generated for example by interrupt means 200), the SMDR information stored in the storage means 30 may be dumped therefrom into the alternative storage means (not shown) via the SMDR bus. Also, storage means 30 and alternative storage (not shown) may be used to contain program code for controlling the sequence of operations to be performed by the microprocessor 50 in the above-detailed preferred embodiment of the system 10 according to the instant invention. Additionally, the system 10, 10' of the present invention may automatically inform the user thereof as to the number of voice mail messages received for the user and may also provide the user with summaries of the contents of such messages automatically or upon provision of a predetermined input from the user. The system may prompt the caller leaving voice mail to leave a summary of his message, in order to provide this summary to the intended recipient of the message. Other variations are also possible without departing from the present invention. For example, the fourth aspect of the present invention may be modified so that at least one of the functions performable by the system 10, 10' permits the user to define and/or formulate a user-defined function which may comprise one or more standard functions performed by the system in sequence. Accordingly, the present invention is intended only to be limited by the hereinafter appended claims.

TABLE 1

| | |
|---|---|
| Option 1 message: | "To call another extension, enter the extension number or dial *1 to call that person by last name." |
| Option 2 message: | "To make an outside call, dial 9 or dial the extension number assigned to the particular line through which you wish to call." |
| option 3 message: | "To access your abbreviated messages, dial *8." |
| Option 4 message: | "To program abbreviated dialing numbers, enter *3 and follow instructions. To use your abbreviated dialing numbers enter #n", where n is a number from 0 to 9." |
| Option 5 message: | "To configure the system dial *4." |
| Option 6 message: | "To configure your extension, dial *6." |
| Option 7 message: | "To configure an outside line, dial *7 followed by the extension number for that line." |

We claim:

1. A private branch exchange system (10,10') having a plurality of input and output ports, each of said ports having a plurality of digitally encoded time division multiplexed signals in a plurality of time slots, said system (10,10') comprising:

a. control means (12) for controlling operation of said system (10,10') and also being programmed to generate supervisory data;

b. switch means (14) for interconnecting any of said plurality of time slots of said ports (1a,b, . . . 4a,b), said switch means (14) being connected to said control means (12) so as to be able to receive both control data and supervisory data therefrom, said switch means (14) also being for transmitting supervisory data received to at least one port (1a,b, . . . 4a,b) selected by said control means (12); and c. means (38) for connecting at least one selected time slot of said input ports to an outside public communications network having a plurality of remote locations accessible by said public communications network, said connecting means (38) being capable of accessing said remote locations through said public communications network.

2. A system (10,10') according to claim 1, wherein said control means (12) is capable of generating complex supervisory data.

3. A system (10,10') according to claim 2, wherein said control means (12) is capable of generating complex supervisory data having cadence.

4. A system (10,10') according to claim 3, wherein said cadence has a predetermined periodicity.

5. A system (10,10') according to claim 1, and further comprising, storage means (30) for containing message data, said control means (12) being able to transmit said message data to said storage means (30).

6. A system (10,10') according to claim 5, wherein said storage means (30) is adapted to receive digitized voice messages from said switch (14), store said message data, and re-transmit said message data to said switch (14).

7. A system (10,10') according to claim 5, wherein said storage means (30) contains message data for assisting in use of the system (10,10').

8. A system (10,10') according to claim 5, wherein:

i. said control means (12) comprises processor means (50) and system bus (24) means permitting communication between said system (10,10') and said processor means (50); and ii. said storage means (30) comprises a circular memory buffer array for storing said supervisory data.

9. A system (10,10') according to claim 1, wherein said system (10,10') is also capable of combining desired time slots of said input (1a . . . 4a) and output ports (1b, . . . 4b) to permit conference-type communication among said time slots of said ports (1a,b, . . . 4a,b).

10. A method for facilitating conference-type communication among three desired extensions' output time slots of a digital private branch exchange system (10) having a plurality input ports (1a, . . . 4a) corresponding to a plurality of incoming communications and a plurality of output ports (1b, . . . 4b) corresponding to a plurality of outgoing communications including at least one feedback receiving (4a) and transmitting port (4b), each of said plurality of input (1a, . . . 4a) and output (1b, . . . 4b) ports having a plurality of digitally encoded time division multiplexed signals, each in a pulse code modulated format, in a plurality of time slots, said system (10) comprising control means (12) for controlling operation of said system (10), switch means (14) for interconnecting any of said plurality of time slots of said ports (1a,b ... 4a,b), feedback bus means (20) for connecting said at least one feedback receiving (4a) and transmitting (4b) ports, and means (38) for connecting at least one selected time slot of said input ports to an outside public communications network having a plurality of remote locations accessible by said public network, said connecting means being capable of accessing said remote locations through said public network, said method comprising the steps of:

a. connecting said three desired output time slots to respective time slots of said feedback bus (20);

b. associating said three desired output time slots to form three unique pairs of said desired time slots, each said pair consisting of two of said desired output time slots each;

c. converting each of said two output time slots of each of said three unique pairs of desired output time slots from said pulse code modulated format into a linear coded format;

d. summing each of said two output slots converted into said linear coded format of each of said three unique pairs of desired output time slots to form three respective linear sums corresponding respectively to each said unique pair;

e. reconverting each of said three respective linear sums from said linear coded format into pulse code modulated format;

f. supplying each said reconverted sums to additional respective time slots of said feedback bus (20); and g. respectively connecting each said additional time slot to a desired extension input time slot not included within the corresponding unique pair of each said additional time slot.

11. A method according to claim 10, wherein steps c-e respectively comprise the use of digital signal processing techniques, and wherein the converting of each said two slots from said pulse code modulated format into said linear coded format at step c includes the elimination of mu-law or A-law encoding.

12. A method according to claim 10, and further comprising:

h. generating data corresponding to fixed values useful in converting said desired slots to said linear format and in reconverting said linear sums into pulse code modulated format; and i. storing said data generated in step h in an associative memory array.

13. A method according to claim 12, wherein said fixed values comprise all possible reconverted sum data values for said two output time slots; and, said associative memory array is a two dimensional matrix array having indexes M and N corresponding to all possible pulse code modulated data values for each of said two output time slots and said fixed values are stored in said matrix so that a particular reconverted sum data value of actual pulse code modulated data values of said two output time slots may be accessed by using said actual values as indexes, respectively, into said matrix array.

14. A method for controlling a private branch exchange system (10,10') as claimed in claim 1, wherein said control means (12) generates supervisory data equal to $F_I$ wherein $F_I$ is calculated using the formula $$[G_1 * \sin(I*2*pi*C*N_2) + G_2 * \sin(I*2*pi*C*N_3)]/G_3,$$

wherein $G_1$, $I$, $C$, $N_2$, $G_2$, $N_3$, and $G_3$ are variables.

15. A method according to claim 14, wherein the variables $N_2$, $N_3$, $G_1$, $G_2$, and $G_3$, are set equal to, respectively, 350, 440, 1, 2, and 3.

16. A method according to claim 14, wherein $N_2$, $N_3$, $G_1$, $G_2$, and $G_3$, are set equal to, respectively, 480, 620, 1, 2, and 3.

17. A method according to claim 14, wherein the variables $N_2$, $N_3$, $G_1$, $G_2$, and $G_3$ are set equal to, 440, 480, 1, 2, and 3, respectively.

18. A call forwarding method for use in a system (10,10') according to claim 1, and comprising the steps of:

a. connecting an incoming call from one time slot of said input ports to a desired extension time slot; and b. disconnecting said call from said desired time slot, after a period of time has elapsed, and reconnecting said call to said at least one remote location associated with said desired time slot, said remote location being accessed through said public communications network by said connecting means (38).

19. A call forwarding method according to claim 18, and further comprising, prior to allowing transfer of data from said incoming call to said remote location, requiring submission of a password from said remote location.

20. A call forwarding method according to claim 18, wherein said remote location is a second desired extension.

21. A call forwarding method according to claim 20, and further comprising, prior to allowing transfer of data from said incoming call to said remote location, requiring submission of a password from said remote location.

22. A method for facilitating conference-type communication among a plurality of desired extensions' output time slots of a private branch exchange system (10) having a plurality input ports (1a, ... 4a) corresponding to N of incoming communications and N of output ports (1b, ... 4b) corresponding to a plurality of outgoing communications including at least one feedback receiving (4a) and transmitting port (4b), each of said plurality of input (1a, ... 4a) and output (1b, ... 4b) ports having a plurality of digitally encoded time division multiplexed signals, each in a pulse code modulated format, in a plurality of time slots, said system (10) comprising control means (12) for controlling operation of said system (10), switch means (14) for interconnecting any of said plurality of time slots of said ports, feedback bus means (20) for connecting said at least one feedback receiving (4a) and transmitting (4b) ports, and means (38) for connecting at least one selected time slot of said input ports to an outside public communications network having a plurality of remote locations accessible by said public communications network, said connecting means being capable of accessing said remote locations through said public communications network, said method comprising the steps of:

a. connecting said plurality of desired output time slots to respective time slots of said feedback bus;

b. associating said plurality of desired output time slots to form N unique groups of said desired time slots, each said group consisting of N-1 of said desired output time slots each;

c. converting each of said N-1 output time slots of each of said unique groups of desired output time slots from said pulse code modulated format into a linear coded format;

d. summing each of said N-1 output slots converted into said linear coded format of each of said groups of desired output time slots to form a plurality of respective linear sums corresponding respectively to each said unique group;

e. reconverting each of said plurality of respective linear sums from said linear coded format into pulse code modulated format;

f. supplying each said reconverted sums to additional respective time slots of said feedback bus; and g. respectively connecting each said additional time slot to a desired extension input time slot not included within the corresponding unique group of each said additional time slot.

23. A method according to claim 22, wherein steps c–e respectively comprise the use of digital signal processing techniques, and wherein the converting of each said N-1 time slots from said pulse code modulated format into said linear coded format at step c includes the elimination of mu-law or A-law encoding.

24. A method according to claim 22, and further comprising:

h. generating data corresponding to fixed values useful in converting said desired slots to said linear format and in reconverting said linear sums into pulse code modulated format; and i. storing said data generated in step h in an associative memory array.

25. A method according to claim 24, wherein said fixed values comprise all possible reconverted sum data values for said N-1 output time slots; and, said associative memory array is a matrix array having indexes corresponding to all possible pulse code modulated data values for each of said N-1 output time slots and said fixed values are stored in said matrix so that a particular reconverted sum data value of actual pulse code modulated data values of said N-1 output time slots may be accessed by using said actual values as indexes, respectively, into said matrix array.

26. A method for automatically assisting a user of a private branch exchange system (10,10') in using said system (10,10'), said system (10,10') having a plurality of input (1a, ... 4a) and output (1b, ... 4b) ports, each of said ports (1a,b, ... 4a,b) having a plurality of digitally encoded time division multiplex signals in a plurality of time slots, said system (10,10') including control means (12) for controlling operation of said system (10,10'), switch means (14) for interconnecting any of said plurality of time slots, storage means (30) for storing a plurality of verbal messages related to assisting said user in using said system (10,10'), and means (38) for connecting at least one selected time slot of said input ports to an outside public communications network having a plurality of remote locations accessible by said public network, said connecting means being capable of accessing said remote locations through said public network, said method comprising the steps of:

a. detecting an initial user input to said system (10,10');

b. prompting said user to select a desired function to be assisted in using from a set of functions performable by said system (10,10') by transmitting an appropriate message from said plurality of messages to said user, said appropriate message reciting said set of functions and subsequent inputs associated with each of said set of functions required to be inputted to be assisted in using said functions; and c. detecting subsequent user input associated with said desired function.

27. A method according to claim 26, and further comprising, transmitting to said user an instructional message concerning said desired function from said plurality of messages.

28. A method according to claim 26, wherein said initial user input comprises a predetermined string of keypad entries.

29. A method according to claim 26, wherein said initial user input comprises use of a hook-flash signal.

30. A method for automatically assisting a user at an extension of a digital private branch exchange system (10, 10') according to claim 1 in using said system, said method comprising:

a. storing in storage means (30) a plurality of digitized verbal messages related to assisting said user in using functions performable by said system (10,10'); b. detecting an initial user input to said system (10,10');

c. prompting said user to select a desired function from a set of functions performable by said system (10,10') by transmitting an appropriate message from said plurality of messages to said extension, said appropriate message reciting said set of functions and subsequent inputs associated with each of said set of functions;

d. detecting subsequent user input associated with said desired function; and e. transmitting to said extension an instructional message about said desired function from said plurality of messages.

31. A method according to claim 30, and further comprising, repeating steps c–e until a termination signal is detected.

32. A method according to claim 30, and further comprising, after step e, the following additional step:

f. prompting said user to command said system (10,10') to perform said desired function.

33. A system (10,10') according to claim 1, wherein message data is stored in storage means (30), is related to voice mail, and is transmitted to at least one time slot upon occurrence of a predetermined event.

34. A system (10,10') according to claim 33, wherein said event comprises a hook flash.

35. A system (10,10') according to claim 1, and further comprising, indicator means for indicating to said control means that data is to be transmitted in said system.

36. A system according to claim 35, wherein said indicator means (200) is able to transmit an interrupt signal to said control means (50).

37. A system (10,10') according to claim 36, wherein said interrupt signal is non-maskable.

38. A system (10,10') according to claim 1, wherein said data is transferred in said system (10,10') by using direct memory access techniques.

39. A system (10,10') according to claim 1, wherein said supervisory data comprise verbal supervisory data corresponding to at least one verbal call-status message stored in storage means (30).

40. A system (10,10') according to claim 39, wherein said at least one verbal message includes an error message indicating that a call placed through the system cannot be completed to an intended recipient thereof.

41. A private branch exchange system (10,10') having a plurality of input (1a, ... 4a) and output ports (1b, ... 4b), each of said ports (1a,b, ... 4a,b) having a plurality of digitally encoded time division multiplexed signals in a plurality of time slots, said system (10,10') comprising:

a. control means (12) for controlling operation of said system (10,10') and also for generating supervisory data;

b. switch means (14) for interconnecting any of said plurality of time slots of said ports, said switch means (14) being connected to said control means (12) so at to be able to receive both control data and supervisory data therefrom, said switch means (14) also being for transmitting supervisory data received to at least one port selected by said control means (12);

c. storage means (30) for storing supervisory data generated by said control means (12) and for supplying said stored supervisory data to said switch means (14); and d. means (38) for connecting at least one selected time slot of said input ports to an outside public communications network having a plurality of remote locations accessible by said public communications network, said connecting means (38) being capable of accessing said remote locations through said public communications network.

42. A system (10,10') according to claim 41, wherein said storage means (30) is also for storing verbal message data corresponding to a plurality of verbal messages related to operation of said system (10,10').

43. A system (10,10') according to claim 42, wherein at least one of said plurality of verbal messages is a verbal instructional message for assisting said user to learn how to operate said system (10,10').

44. A method according to claim 32, and further comprising, after step f, the following step of:

g. performing said desired function commanded by said user.

45. A method according to claim 32, wherein said desired function permits said user to define at least one user-defined function.

46. A method according to claim 45, wherein said user-defined function comprises a sequence of standard functions.

47. A method according to claim 44, wherein said desired function is an abbreviated dialing function.

48. A method according to claim 44, wherein said desired function is a function for changing a system access password.

49. A call-forwarding method for use in a system (10,10') according to claim 1, and comprising the steps of:

a. connecting an incoming call from at least one time slot corresponding to a desired extension; and b. disconnecting said call from said desired extension and reconnecting said call to at least one other extension.

50. A call-forwarding method according to claim 49, and further comprising, between steps a and b, prompting for input of said at least one other extension.

51. A call forwarding method according to claim 49, wherein said at least one other extension comprises at least one remote location accessible using connection means (38) via an outside public communications network.

52. A call-forwarding method according to claim 49, and further comprising, prompting for entry of said at least one other extension between steps a and b, said prompting comprising use of verbal message data stored in said storage means (30), said message data corresponding to at least one verbal message.

53. A call-forwarding method according to claim 52, wherein said at least one verbal message comprises a message indicating that said desired extension is busy.

* * * * *